United States Patent [19]

Cavender

[11] 4,274,252
[45] Jun. 23, 1981

[54] SWIVEL LOCKING DEVICE

[76] Inventor: John L. Cavender, P.O. Box 685, Moorhead, Miss. 38761

[21] Appl. No.: 45,060

[22] Filed: Jun. 4, 1979

[51] Int. Cl.³ .............................................. F16G 15/08
[52] U.S. Cl. ........................................ 59/86; 59/87; 59/95
[58] Field of Search ..................... 403/78, 379; 59/78, 59/85, 86, 93, 95, 87

[56] References Cited

U.S. PATENT DOCUMENTS

| 1,253,971 | 1/1918 | Hipsher | 59/95 |
|---|---|---|---|
| 2,193,291 | 3/1940 | Marchins | 59/95 |
| 2,341,544 | 2/1944 | Gruender | 403/379 |
| 2,400,291 | 5/1946 | D'Aleo | 59/95 |
| 2,463,124 | 3/1949 | Sims | 403/379 |
| 2,600,578 | 6/1952 | Royer | 403/379 |

Primary Examiner—John McQuade
Attorney, Agent, or Firm—Stevens, Davis, Miller & Mosher

[57] ABSTRACT

A novel swivel locking device is described comprising a swivel portion having a means for joining two members wherein at least one of said members includes two portions extending to form part of a loop, a detachable loop portion having two ends that fit together with said extending portions of said swivel member to form a closed loop, a rod member extending through holes in said extending portions and detachable loop portion to join said extending portions of the swivel with said detachable loop portion, and a fastening means for securing the position of said rod with respect to the extending portions and the detachable loop portion.

8 Claims, 6 Drawing Figures

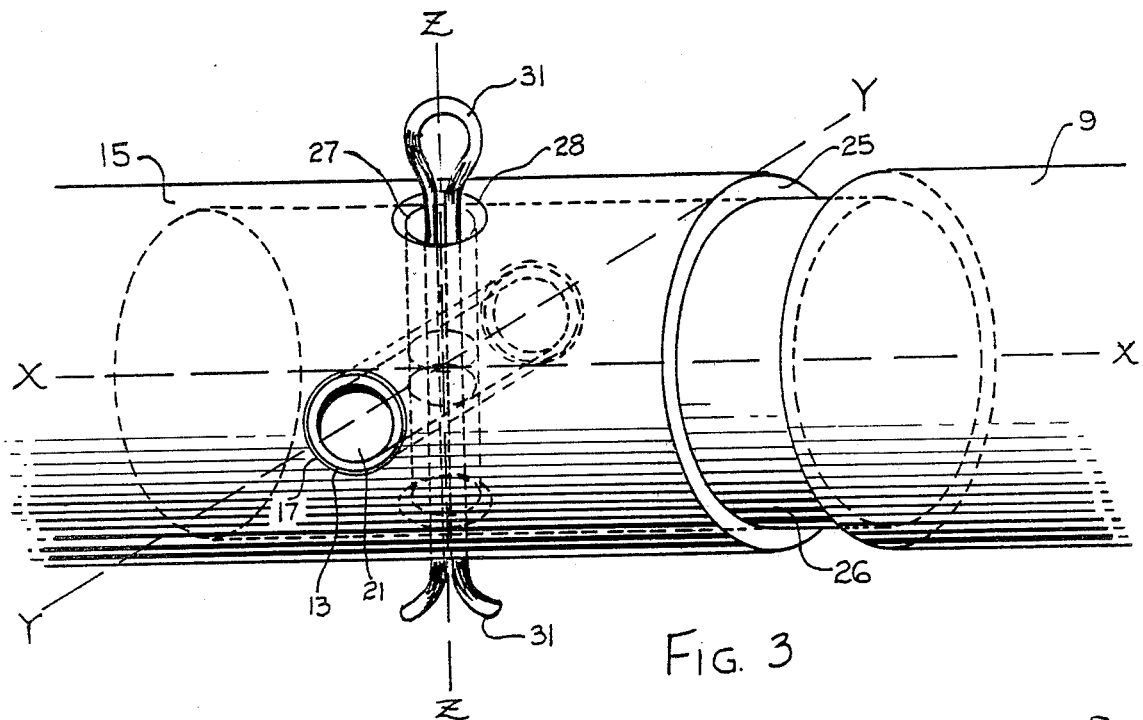
FIG. 3
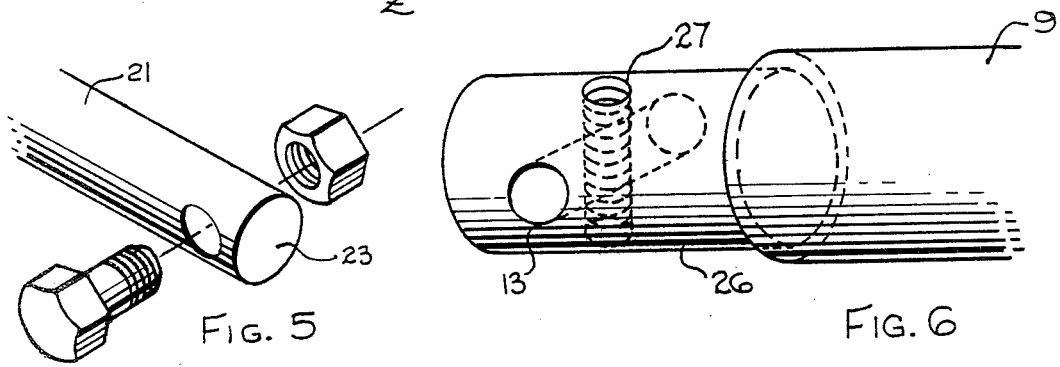
FIG. 5
FIG. 6
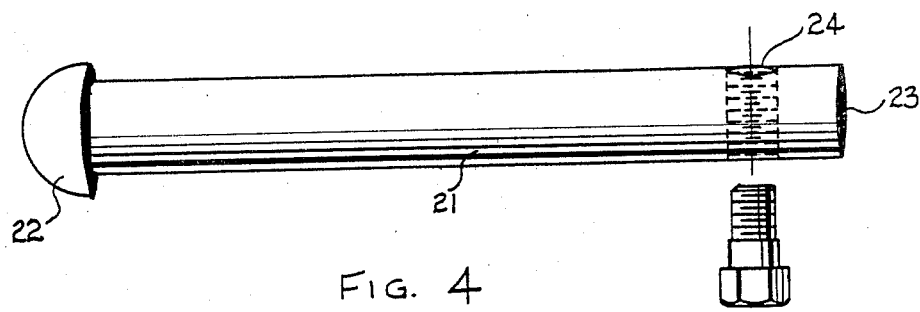
FIG. 4

SWIVEL LOCKING DEVICE

BACKGROUND OF THE INVENTION

This invention relates to swivel locking devices, and particularly to a swivel locking device of improved construction and reliability.

It is often desirable to secure an animal or some other movable object in a particular area while still allowing for some freedom of movement for the animal or other object. For example, it is desirable in the case of an animal such as a dog to allow the dog freedom to move, but at the same time prevent the dog from straying out of a local area. To accomplish this, a length of leather, rope, or preferably a metal chain, (hereinafter collectively referred to as the "chain") is attached at one end to a collar on the neck of the dog, and at the other end is attached to a fixed object, such as a tethering stake in the ground, or a wire run arranged between two fixed objects, such as trees.

In order to facilitate attaching and detaching the animal using such an arrangement, conventionally one or both ends of the length of chain are provided with some type of readily attachable securing device, such as a spring-loaded link, in which a spring present in the link acts to close the link and thereby secure one end of the leash comprising a loop, e.g., the terminal link of a chain. An example of a snap link of this type is described in U.S. Pat. No. 3,911,671.

Because an animal secured as noted above may also move in circular patterns or repeatedly turn in a particular direction, it is also desirable to provide a swivel mechanism in the chain between the dog and the fixed object, so that the chain does not become coiled and tangled. This can be accomplished by use of a snap swivel.

Spring-loaded snap links and swivels are subject to failure due to loss of resiliency of the spring, rusting of the spring mechanism resulting in sticking, and are relatively expensive to manufacture with the precision required for proper utility. A loss of resiliency of the spring can easily result in opening of the link when subjected to stress, such as by the movement of an animal such as a dog.

Therefore a need exists for a simple, inexpensive, reliable means for securing an animal or other object to a fixed object.

SUMMARY OF THE INVENTION

The present invention comprises a novel swivel locking device having the desirable properties noted above and overcoming the deficiencies of spring-loaded snap links. The novel swivel locking device comprises: a swivel portion having a means for joining two linking members in such a manner that each member is freely rotatable with respect to the other member about a first axis defined by the axis of the joining means, wherein at least one of said members includes two portions extending to form part of a loop, each of said extending portions containing a hole in proximity to the end thereof oriented such that the two holes define a second axis substantially perpendicular to the axis of the swivel; a detachable loop portion having two ends which fit together with said extending portions of said swivel member to form a closed loop, said detachable loop portion further comprising holes in proximity to the ends thereof that align with the holes of the extending portions on said second axis; a rod member extending along said second axis and through all of said holes to thereby join said extending portions of the swivel with said detachable loop portion, said rod member being enlarged at one end thereof, and in proximity to the opposite end having an opening therein, said opening in said rod being alignable with additional openings formed in proximity to at least one end of the extending portion and the detachable loop portion, said openings aligning along a third axis substantially perpendicular to the plane defined by the first axis and the second axis; and a fastening means for securing the position of said rod with respect to the extending portions and the detachable loop portion by insertion through said opening in said rod and said additional alignable openings in said extending and detachable loop portions.

BRIEF DESCRIPTION OF THE DRAWINGS

FIG. 3 is an expanded perspective view of a portion of a swivel locking device according to the invention.

FIG. 4 is an expanded perspective view of a rod according to the invention including a threaded opening.

FIG. 5 is an expanded perspective view of a rod according to a further embodiment of the invention.

FIG. 6 is an expanded perspective view of a portion of a further embodiment of the swivel locking device according to the invention.

DETAILED DESCRIPTION OF PREFERRED EMBODIMENT

Figure 1:
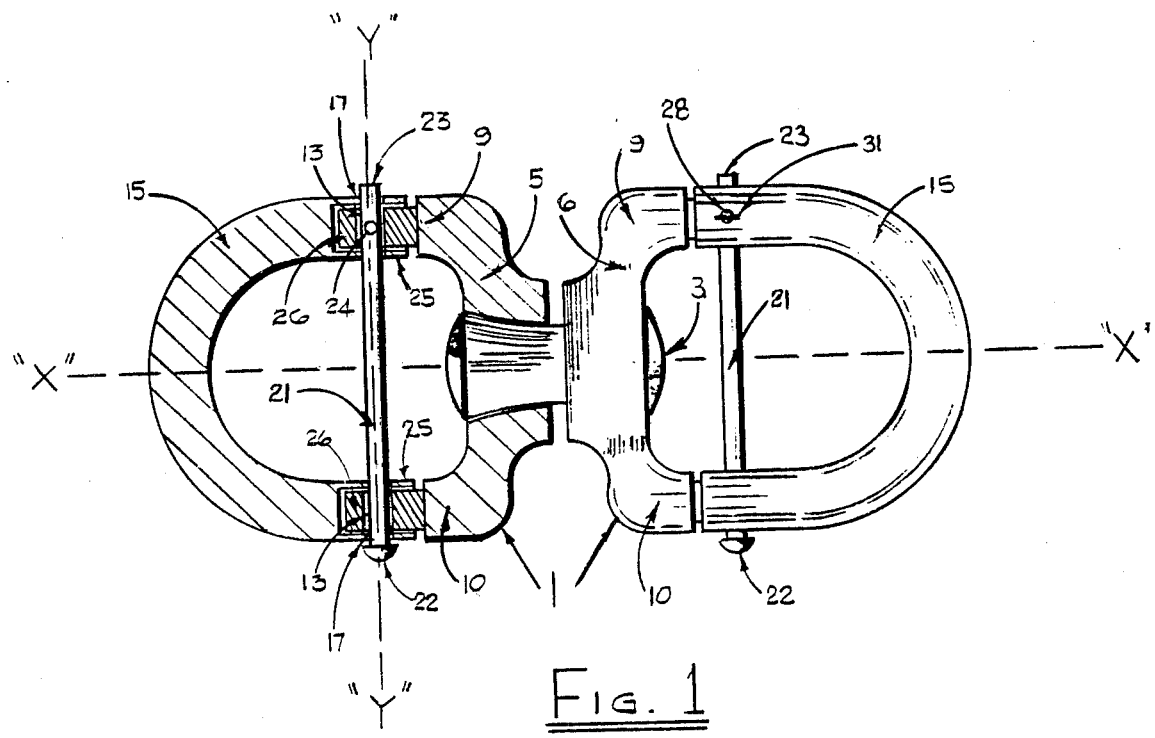
FIG. 1 is a view in partial cross-section of a swivel locking device according to the invention.
Figure 2:
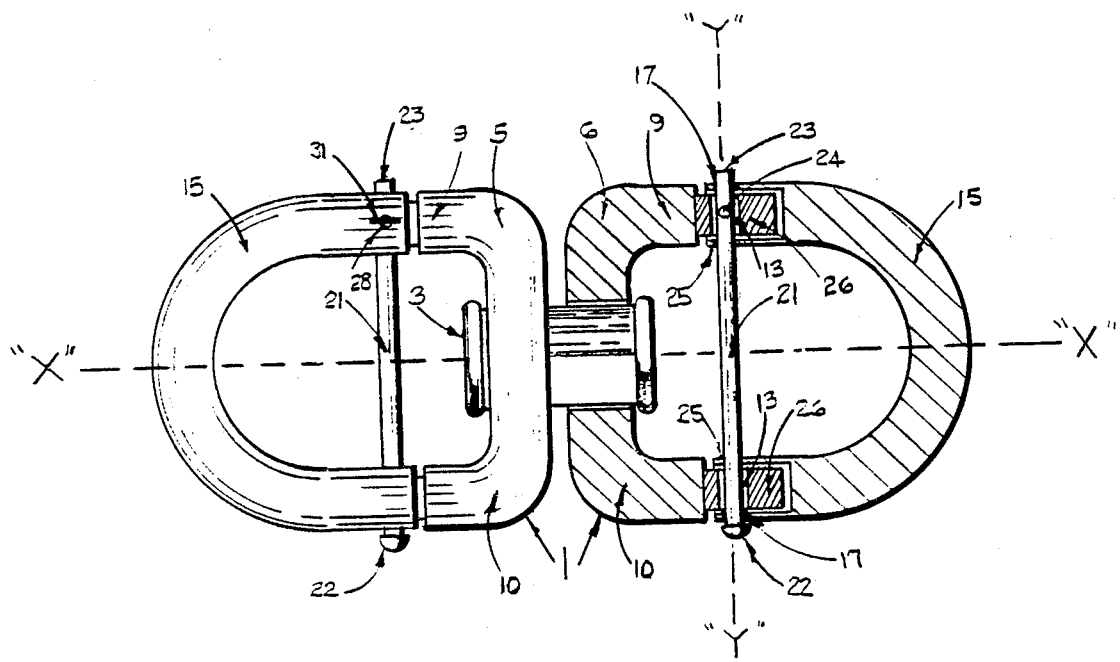
FIG. 2 shows an alternative swivel locking device according to the invention.

In a preferred embodiment of the invention, as illustrated in FIGS. 1 and 2, the swivel locking device according to the invention comprises a swivel portion 1 having a means 3 for joining two members 5 and 6 such that each of members 5 and 6 is freely rotatable with respect to the other member about a first axis X defined by the axis of the joining means 3. As illustrated, both linking members include two portions 9 and 10 extending to form part of a loop. Each portion carries a hole coupling member extending from the end thereof. Furthermore, for each hole coupling member there are holes 13 in proximity to the end of each of the extending portions oriented such that the holes have a common second axis Y substantially perpendicular to the first axis (of the swivel).

As illustrated in FIGS. 1–3, a detachable loop portion 15 has two ends, which fit together with said extending portions of the swivel member, to form a closed loop. The ends of the detachable loop portion 15 comprise female coupling members 25, although other coupling means can also be used. These members fit over the male coupling members 26 of extending portions 9 and 10. In proximity to the ends of the detachable loop portion are holes 17 which align with holes 13 of the extending portions along the second axis Y.

A rod member 21 is positioned along axis Y through the holes 13 and 17, to thereby join the extending portions of the swivel with the detachable loop portion. The rod member is enlarged (i.e., is larger than the holes into which it fits) at one end 22, and in proximity to the opposite end 23 has an opening 24 alignable with additional openings 27 and 28 formed in proximity to the joined ends of at least one of the extended portions and the detachable loop portion, respectively, in a direction Z substantially perpendicular to the plane formed by the first axis of the swivel and the second axis of the rod.

As illustrated in the expanded perspective view of FIG. 3, a fastening means, such as cotter pin 31, can be used to secure the position of the rod with respect to the extending portion and the detachable loop portion.

In an alternative embodiment, instead of a cotter pin, a screw may be used, which may be secured through the openings either by engagement with a threaded nut on the other side of the openings or which is secured in the openings by engagement with a threaded opening in the rod (FIG. 4) or threaded openings in at least one of the openings in the extending and detachable loop portions.

What is claimed is:

1. A swivel locking device comprising two members defining a hole in each therethrough;
   a means passing through said holes for joining said two members in such a manner that each member is freely rotatable about a first axis defined by the axis of the joining means and with respect to each other, wherein at least one of said members includes two portions extending to form part of a loop, each of said extending portions containing a hole in proximity to the end thereof oriented such that the two holes define a second axis substantially perpendicular to the first axis of the means and an additional hole in the end of at least one extending portion perpendicular to the other hole;
   a detachable loop portion having two ends that fit together with said extending portions of said member to form an unyielding closed loop, said detachable loop portion further comprising holes in proximity to the ends thereof that align with the holes of the extending portions on said second axis, and an additional hole in at least one end perpendicular to the other hole;
   a rod member extending along said second axis and through all of said holes on the second axis to thereby join said extending portions of the member with said detachable loop portion, said rod member being enlarged at one end thereof, and in proximity to the opposite end having a hole therein, said hole in said rod member being alignable with said additional holes formed in proximity to at least one end of the extending portion of the member and at least one end of the detachable loop portion, said holes aligning along a third axis substantially perpendicular to the first axis and the second axis; and
   a fastening means for securing the position of said rod member with respect to the extending portions and the detachable loop portion inserted through said hole in said rod and said additional aligned holes in said extending and detachable loop portions.

2. A swivel locking device as in claim 1 wherein at least one of the extending portions joins at least one end of the detachable loop portion by means of a male-female coupling.

3. A swivel locking device as in claim 2 wherein at least one end of the extending portions comprises a male coupling member and at least one end of the detachable loop portion comprises a female coupling member.

4. A swivel locking device as in claim 1 wherein the fastening means comprises a cotter pin.

5. A swivel locking device as in claim 1 wherein the fastening means comprises a screw.

6. A swivel locking device as in claim 5 wherein said fastening means consists of a screw in engagement with a threaded nut.

7. A swivel locking device as in claim 5 wherein said screw is secured through said openings by engagement with a threaded opening in said rod.

8. A swivel locking device as in claim 5 wherein said screw is secured through aligned holes along said third axis by engagement with a threaded hole in at least one of the holes in the extending and detachable loop portions.

* * * * *